United States Patent [19]

Giardini

[11] 4,208,229
[45] Jun. 17, 1980

[54] SYSTEM FOR REPAIRING PANES OF GLASS

[76] Inventor: Dante S. Giardini, 5702 Heritage Ct., Dearborn Heights, Mich. 48127

[21] Appl. No.: 969,655

[22] Filed: Dec. 15, 1978

[51] Int. Cl.² .................... B32B 35/00; B24B 9/10; B23B 39/22; B23B 27/20
[52] U.S. Cl. .................. 156/94; 30/164.95; 30/276; 51/5 C; 51/81 R; 51/111 R; 51/283 R; 51/410; 125/20; 156/98; 156/256; 156/293; 156/330; 156/513; 408/27; 408/37; 408/41; 408/118; 408/119; 408/145
[58] Field of Search .............. 30/164.95, 276; 51/5 C, 51/81 R, 111 R, 125, 168, 283 R, 410, 345; 125/20; 156/94, 98, 256, 293, 513; 408/27, 37, 41, 118, 119, 145

[56] References Cited

U.S. PATENT DOCUMENTS

| | | | |
|---|---|---|---|
| 2,941,338 | 6/1960 | Santschi | 51/81 R |
| 3,007,686 | 11/1961 | Pearson | 125/20 X |
| 3,179,729 | 4/1965 | Richardson | 156/153 X |
| 3,494,348 | 2/1970 | Lindblad | 125/20 |
| 3,568,367 | 3/1971 | Myers | 125/20 X |
| 3,813,820 | 6/1974 | Highberg et al. | 51/81 |
| 3,902,940 | 9/1975 | Heller et al. | 264/36 X |
| 3,986,913 | 10/1976 | Walz | 156/98 |
| 4,073,094 | 2/1978 | Walz | 51/111 R |
| 4,132,516 | 1/1979 | Story | 156/94 X |

Primary Examiner—William A. Powell
Assistant Examiner—Robert A. Dawson
Attorney, Agent, or Firm—Gifford, VanOphem, Sheridan & Sprinkle

[57] ABSTRACT

A method for repairing panes of glass is provided which enables fractured panes to be strengthened and holes refilled while the pane remains installed in its support structure. The method comprises steps for relieving stress points in a fractured pane, and for applying substantially transparent materials for filling portions of the pane where glass has been removed or separated. The method enables repair of laminated glass panes as well as solid glass panes.

9 Claims, 11 Drawing Figures

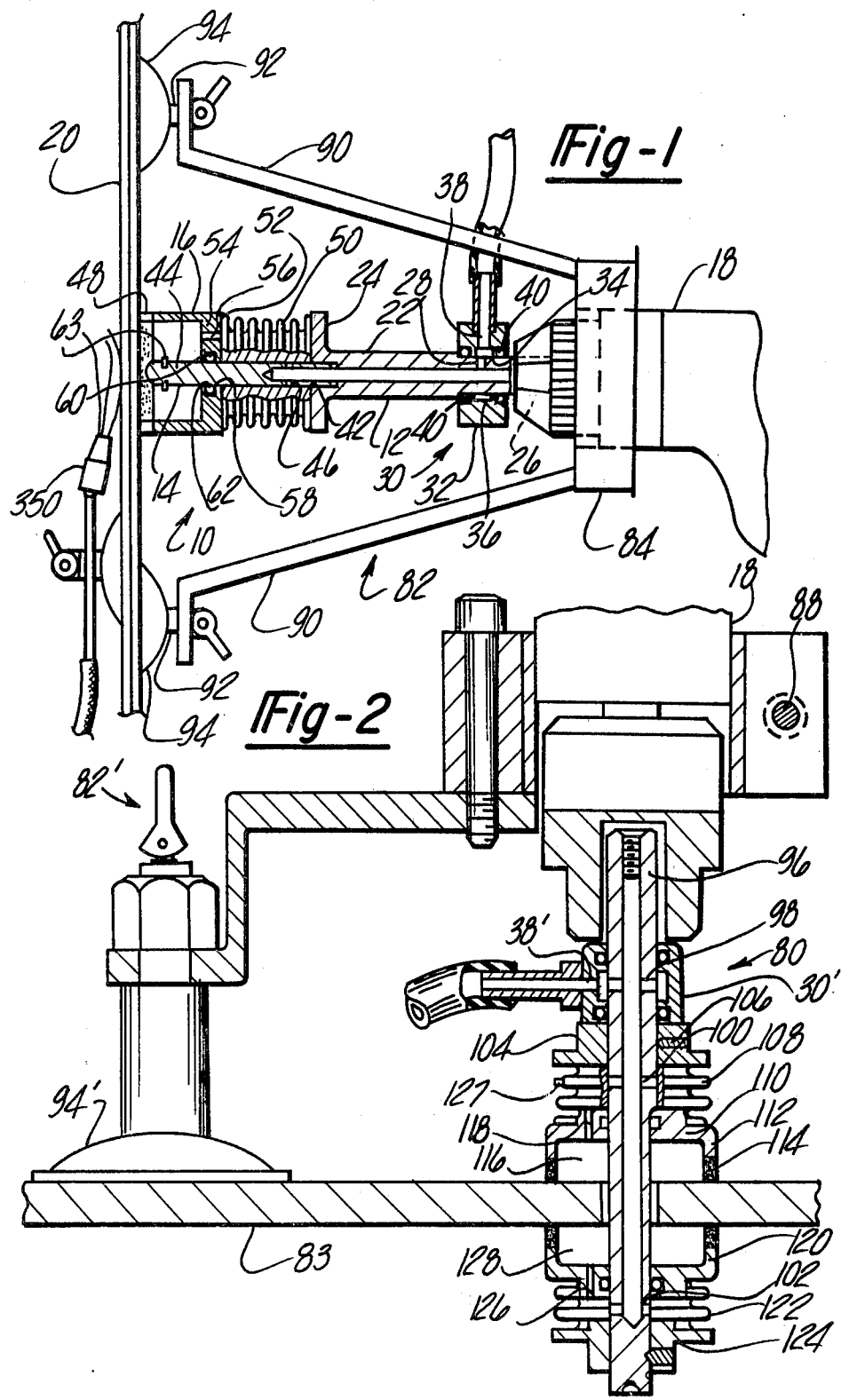

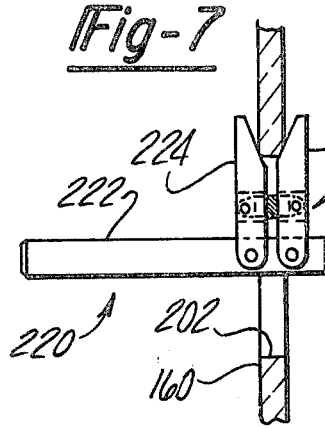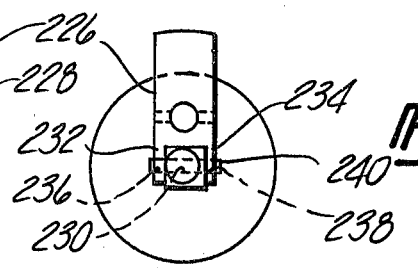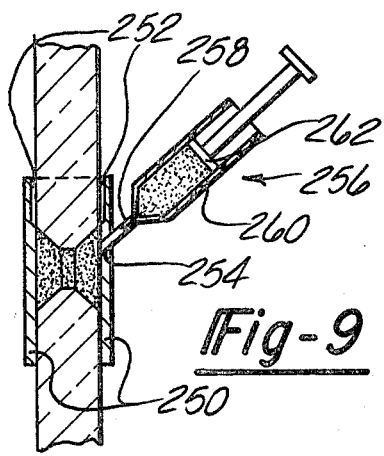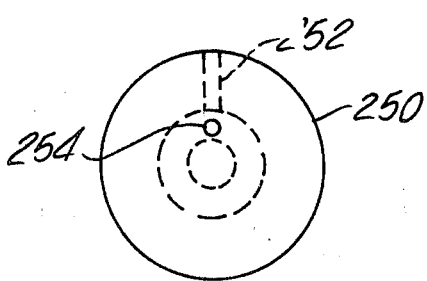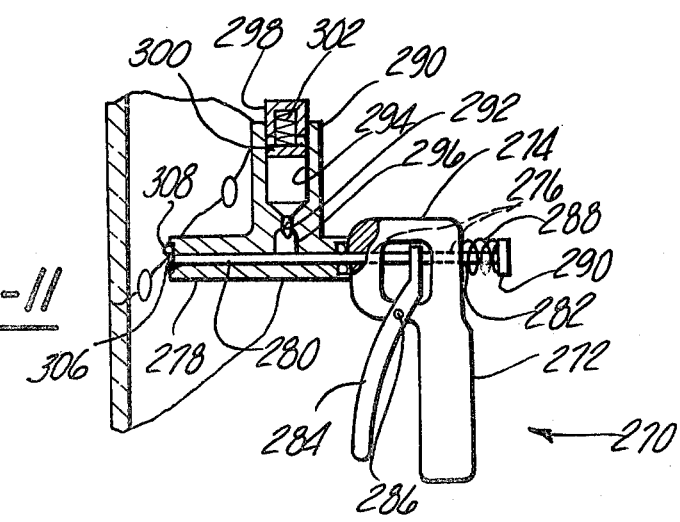

SYSTEM FOR REPAIRING PANES OF GLASS

BACKGROUND OF THE INVENTION

I. Field of the Invention

The invention relates generally to a method for repairing glass panes and more particularly, to such a method which permits repair of the pane without removal of the pane from its support structure.

II. Description of the Prior Art

It is well known that glass is a brittle material and is quite susceptible to fracturing upon impact with another object. Fractures of the glass panes often result in sharp edges which can be very dangerous. Moreover, once a pane has been fractured, portions of the pane may become dislodged from the main body of the pane which results in a weakened pane structure susceptible to breakage from very slight forces or stresses. In addition, once a crack has been started in a pane of glass, forces and stresses which would not have been strong enough to originally fracture the glass can cause the cracks to lengthen throughout the body of the pane. Since replacement of the entire pane is extremely costly, it would be advantageous to be able to effectively repair and secure fractured portions of a pane so that replacement of the pane is not necessary.

In order to effectively repair the pane of glass, it is first necessary to eliminate points of stress within the pane. For instance, an incomplete crack in a pane of glass cannot be effectively repaired by merely applying glue or other adhesive within the crack since the end of the crack is a point of high stress and the crack can easily be continued by relatively light stresses or forces exerted upon the pane even though the original portion of the crack has been glued. It has been found that a stress point such as that at the end of a crack can be eliminated by cutting a smooth hole around the end of the crack to eliminate rough edges which become points of maximum stress.

The previously-known devices for cutting holes in panes of glass generally utilize annular core drills having a coating of diamond bits secured thereto. Such core drills are often manually urged against one side of the glass pane in order to cut therethrough. Such manually applied forces is often inconstant and thus results in a hole having various stress points around its periphery. Moreover, such inconsistent force causes excessive wear of the diamond bit coating since the abrasion of the core drill against the glass causes diamond bits to break off from the core drill body. Since the cutting blade portion of the core drill wears rapidly, it is necessary to provide a cutting blade portion which is sufficiently long to enable the core drill to be used repeatedly. Since the cutting blade portion is made of diamond bits, the cost of each core drill is relatively high. Thus, it would be advantageous to prolong the wear of the cutting blade portion in order to make the cutting operation more economical.

Another previously-known drilling device disclosed in U.S. Pat. No. 4,073,094 for use on glass panes provides a pair of core drills which are placed on opposite sides of the pane of glass and then simultaneously rotated in one direction while being urged toward each other. A single spring means urges the core drills toward each other. This previously-known device is disadvantageous in that since the axial force applied to each core drill is not separately adjustable, the core drills will abut against each other only at one point within the pane of glass. Thus, when the cutting edge of each core drill becomes slightly worn and rounded, a small ridge will be formed around the periphery of the hole at the point at which the core drills abut against each other. Moreover, since the disclosure of that patent teaches the use of core drills having different diameters, a stepped hole results. Thus, once the core drills abut against each other at a point within the pane, the core drill assembly cannot be axially shifted back and forth to ream out ridges occurring within the drilled hole. In addition, the edge of the step formed within the hole is a point of high stress and, therefore, very susceptible to breakage.

Once a hole has been drilled, it is typical to insert a glass plug and align it within the pane so that it is relatively unnoticeable. Moreover, if the plug is not accurately aligned within the hole, it is difficult to apply epoxy or another adhesive around the plug to provide secure engagement of the plug around its entire periphery within the pane. Thus, it would be advantageous to provide a method which accurately aligns the plug while it is installed so that the entire space around the plug within the hole can be filled with securing agents such as epoxy.

Oftentimes it is disadvantageous to use a core drill to relieve the stress area in the pane of glass since they remove a relatively large area of glass around the fracture. Thus, when only a small hole is to be repaired in the glass, it would be advantageous to remove only a small portion of the glass around the small hole in order to relieve the stress. In addition, the use of a core drill to relieve stress at the end of a crack in a glass pane is disadvantageous because the rotational force of the core drills increases the stress exerted upon the pane and can cause the crack to lengthen. Thus, it would be advantageous to remove such stress points from the pane without exerting torsional stresses incident to the core drilling.

Moreover, when a small hole is to be repaired, it is difficult to effectively secure a plug within the hole. Previously-known cylindrical plugs can be easily dislodged from the pane. Therefore, it would be advantageous to provide a method for forming a plug which lockingly engages the pane of glass, so that the plug cannot be removed from either side of the glass yet which is still mounted flush to the sides of the pane of glass.

It has previously been extremely difficult if not impossible to effectively repair a laminated windshield without delaminating a large portion of the pane. Thus, it is extremely expensive to repair laminated windshields by previously-known methods. Moreover, the difficulty and expense of such an operation often necessitated replacement of the entire laminated pane or windshield.

SUMMARY OF THE INVENTION

The present invention obviates the above disadvantages by providing a method of glass repair which enables panes of glass to be repaired while the pane remains installed within its support structure. The method is particularly applicable for use with core drilling apparatus disclosed in pending U.S. patent applications Ser. Nos. 819,904 and 912,902. The method enables glass panes to be quickly repaired as well as effectively strengthening the pane so as to prevent previously-incurred fractures from spreading or causing additional fractures. In addition, the resulting repair job is relatively invisible to the naked eye and is thus, aesthetically pleasing as well.

With respect to the repair of a pane of solid glass, the system provides means for relieving stress points in the fractured panes by removing glass therefrom, means for refilling fractured areas where glass has been removed, and a filler material which when applied to the fractured areas where glass has been removed remains substantially indetectable with respect to the surrounding glass.

The means for relieving stress points within the glass panes comprises a portable lightweight drill assembly which can be detachably mounted to the pane of glass. The drill assembly includes at least one core drill which is continuously urged against the glass pane by fluid pressure means or spring means as it rotates. In addition, fluid pressure means is also provided for flushing away swarf which accumulates around the area being cut to decrease the abrasive wear of the cutting blade portion of the core drill. The fluid pressure means which urges the core drill against the glass pane is selectively adjustable to provide axial adjustment of the core drill with respect to the pane of glass. The fluid pressure flushing means provides a stream of fluid across the core drill cutting faces so that the swarf is flushed radially outwardly therefrom.

A modification of the above drill assembly comprises a pair of core drills facing each other, each core drill being contiguous to opposite sides of the glass pane. The core drills are simultaneously rotated and urged toward each other by the fluid pressure means. Since each core drill extends only substantially halfway through the pane of glass, the length of the diamond bit coated cutting face of each core drill can be shorter than on previously-known core drills. Consequently, the cost of each core drill is less than those previously-known core drills. Moreover, the fluid pressure flushing means which provides a stream of fluid across the cutting face of each core drill enables these shortened cutting face core drills to effectively cut as many holes as previously-known core drills. The fluid pressure means for urging the core drills toward each other is selectively adjustable to provide a pressure differential between the two core drills so that the force exerted on one core drill exceeds that exerted upon the other core drill to permit a controlled axial displacement of the core drills.

Refilling of the stress relieved hole can be accomplished by inserting a glass plug into the hole after applying a sufficient amount of epoxy to the periphery of the plug so that the entire hole is filled. The method of the present invention provides an alignment disc which is secured to one side of the glass plug by a pressure-sensitive adhesive so that as the plug is inserted into the hole, it is aligned with the surface of the pane of glass. The alignment disc is provided with an annular groove near the edge of the attached plug so that epoxy can be forced around th plug within the hole so that the space around the plug is fully filled with epoxy without entrapping air pockets therein. A detachably mounted locking device secures the disc to one side of the pane of glass until the epoxy cures and thereby secured the properly aligned plug within the hole.

The system of the present invention further provides an easier and less costly method for fixing relatively small holes in a pane of glass, comprising sandblasting stress points in the pane, countersinking the sandblasted hole, and forming an epoxy rivet within the countersunk hole. In addition, such a method is especially effective for securing a fractured pane along the length of the crack in the pane in order to increase the strength of the pane to resist further fracturing by stresses and forces applied to the pane.

The method of the present invention also provides economical and effective repair of laminated windshields of motor vehicles. When a relatively sharp object impacts against a laminated pane, it is quite often the case that only one layer of the pane is fractured. The sharp impact causes a conical fracture to occur in the impacted pane but the conical portion of glass remains lodged between the adjacent layers or panes. The present method includes relieving stress in the pane at the point of impact and replacing only a small portion of the windshield around the conical-shaped broken portion within the laminated pane. The rough edges and stress points are removed by core drilling through the damaged pane around the conical fracture, removing a similarly-shaped portion of the plastic sheet for reasons to be hereinafter described, replacing the removed plastic and glass portions with appropriately sized plastic and glass plugs, applying epoxy to the plugs and clamping the plugs into position until the epoxy cures.

BRIEF DESCRIPTION OF THE DRAWINGS

The method of the present invention and the devices utilized in practicing the methods will be better understood by reference to the following detailed description in conjunction with the accompanying drawing, in which like reference characters refer to like parts in the several views and in which:

FIG. 1 is a cross-sectional view of a core drilling device for use in practicing a method of the present invention;

FIG. 2 is a cross-sectional view of a core drilling device similar to the device shown in FIG. 1 but showing several modifications thereof;

FIG. 7 is a side plan view of another countersinking device for use in the present invention;

FIG. 8 is a front plan view of the device shown in FIG. 7;

FIG. 9 is a cross-sectional view of an apparatus for forming epoxy rivets;

FIG. 10 is a fragmentary front plan view of the apparatus shown in FIG. 9; and

FIG. 11 is a cross-sectional view of an apparatus for filling cracks in a pane of glass for use in practicing th present invention.

DETAILED DESCRIPTION OF THE PRESENT INVENTION

Figure 3:
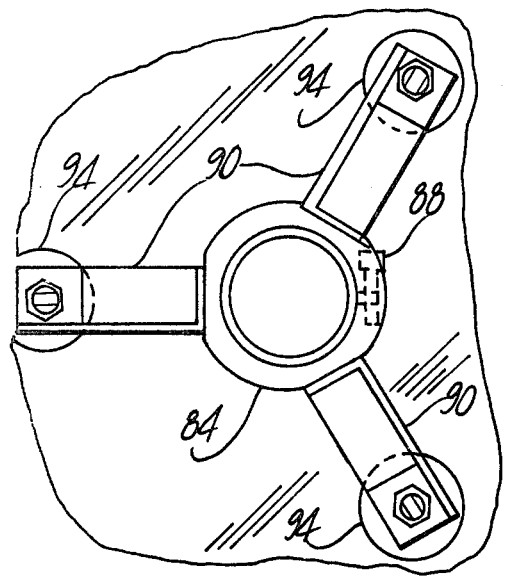
FIG. 3 is a top plan view of the frame of the core drilling devices shown in FIG. 1.

With reference now to FIG. 1, a core drilling device 10 to be used in practicing the present invention is thereshown generally comprising a tubular drill shank 12 with a core drill guide 14 coaxially secured at one end to the drill shank and a core drill 16 secured to the other end of the core drill guide 14. As shown in FIG. 1, the device 10 is thereshown mounted in the chuck of a lightweight portable drill 18 supported by a frame assembly adapted to be detachably secured to the side of a glass pane. Such an arrangement is especially useful for removing damaged portions of the pane as well as for providing circular glass plugs which are used in a manner to be hereinafter described.

The drill shank 12 comprises a tubular stem portion 22 having a radial flange 24 at one end thereof. The other end 26 of the tubular drill shank 12 is closed and is adapted to be received in the chuck of a drill. At least one row of a plurality of radial bores 28 is provided in the tubular stem 22 at a slight distance below the portion 26 of the shank 12 so that a transfer seal 30 can be rotatably secured around the bores 28.

The transverse seal 30 comprises an annular housing 32 having an axial throughbore 34, and an enlarged portion 36 of the bore 34 communicates with the radial bores 28 to provide fluid communication between the central chamber of the tubular shank 12 and a radial bore 38 in the transfer seal housing. The radial bore 38 in turn communicates with a fluid pressure source (not shown). A pair of annular seal rings 40 are secured to the housing intermediate the drill shank 12 and the housing 32 to prevent fluid leakage when the fluid passes from chamber 36 to the radial passages 28.

The core drill guide 14 comprises the tubular-shaped portion 42 and a rod-shaped portion 44 of substantially the same diameter. The tubular portion 42 is coaxially fixedly secured in the drill shank 12 so that the inner bore of the portion 42 communicates with the axial bore of the shank 12. The inner end of the portion 42 is provided with a plurality of radial bores 46. A cylindrical core drill 16 having an annular cutting blade 48 is coaxially axially slidably secured to the portion 44 of the core drill guide 14. An expandable bellows chamber 50 is coaxially secured around the core drill guide 14 between the upper face 52 of the core drill 16 and the lower surface of the flange 24 of the drill shank 12. Thus, the chamber enclosed by the bellows housing 50 fluidly communicates with the axial bore in the portion 42 by the radial passages 46 in the core drill guide 14. The chamber defined by the bellows housing 50 fluidly communicates with the cylindrical bore in the annular core drill 16 through an axial aperture 56 provided in the head portion 54 of the core drill 16. The bellows 50 is sealingly secured to the flange 24 and to the surface 52 to prevent the fluid leakage exteriorly of the bellows chamber 50.

The core drill 16 includes a head portion 54 as mentioned previously which in addition to the axial bore 56 is provided with the coaxial bore 58 through which the core drill guide 14 is axially slidably received. The bore 58 includes an enlarged diameter portion 60 in which a sealing ring 62 is secured so as to sealingly engage the core drill guide 14 as the core drill 16 is axially slid along the length of the portion 44 by the bellows 50 in a manner to be shortly hereinafter described. The annular cutting blade portion 48 comprises a hard coating having diamond bits embedded therein and is secured to the end of the annular portion of the core drill 16 so as to engage the glass plate 20.

After the drill shank 12 has been secured within the chuck of the drill press 18, a fluid pressure source is fluidly connected to the radial passage 38 of the transfer seal 30. As the drill is rotated within the transfer seal 30, the fluid such as water is forced through the radial passages 28 to the interior of the drill shank 12 and in turn through the bore and the portion 42 of the core drill guide and out the radial passages 46 into the bellows chamber 50. Although the fluid within the bellows 50 is directed through the passage 56, the passage 56 is appropriately sized so that the pressure in the bellows is greater than the pressure below the bellows. Thus, the bellows exerts a force against the top surface 52 of the core drill 16 and urges it downwards along the length of the core drill guide 14. Consequently, the force of the cutting face against the glass plate to be cut is controlled by the pressure in the bellows 50.

At the same time the fluid which passes through the fluid passage 56 is forced radially outwardly beneath the face of the cutting blade 48 to remove cutting swarf from around the cutting face. This flushing action prevents clogging of the cutting face which would increase abrasion and cause the diamond bits to break away from the coating on the cutting face. Thus, the combination of the fluid pressure in the bellows and the flushing action combine to prolong the wear of the core drill. Thus, the length of the cutting blade 48 can be shorter than on previously-known core drills without substantially decreasing the length of service of each core drill. Moreover, since the force exerted by the core drill against the glass to be cut is dependent on the pressure in the bellows 50, the core drill is able to cut into the glass with a constant force and such constant force can be predetermined to provide most efficient cutting speed without causing undue stresses in the panes of glass being cut.

As shown in FIG. 1, the core drilling is aligned and secured in position by the mounting frame 82. The mounting frame is adapted to detachably support the core drill device 10 so that the cutting face of the core drill abuts against the side of the pane concentrically around the damaged area.

The mounting frame 82 comprises a ring clamp 84 adapted to engage the housing of the portable drill motor 18 and is secured thereto by locking means such as the threaded bolt 88 (FIG. 3). At least three arms 90 extend radially outwardly from the ring clamp 84. The free end of each arm 90 is secured to a support leg 92 which has a selectively operable vacuum cup 94 secured to its bottom end.

To properly align the frame, a conical headed alignment bit is secured in the chuck of the drill and the drill housing is slid into the ring clamp 84. The frame 82 is then positioned so that the conical head is centered in the fracture hole. The vacuum cups are then employed to secure the frame in that position. The alignment bit is then removed from the chuck and the core drill device 10 is secured in the chuck. The portable drill housing is then slidably positioned within the ring clamp 84 to provide sufficient axial displacement of the core drill cutting face through the width of the pane before the housing is secured within the clamping ring. The housing is secured in the clamping ring when the lower end of the head 54 of the core drill is spaced from the locking ring 63 at least a distance equal to the width of the pane to be cut. After the assembly has been so aligned, the fluid pressure source can be connected, the drill motor switched on and the core drilling operation commenced as described.

With reference now to FIGS. 2 and 3, a core drilling device 80 for use in practicing the method of the present invention is thereshown mounted in a frame 82 adapted to be detachably secured to a pane of glass while the pane remains installed in the support structure. The drilling device 80 comprises a pair of core drills coaxially aligned to engage opposite sides of the glass pane. Fluid pressure driving means and fluid pressure flushing means are provided for each core drill.

The core drilling device 80 comprises a tubular shaft 96 which is closed at each end and is provided with three axially spaced rows of radial throughbores 98, 100, 102 communicating with the central chamber of the tubular shaft. The first row of radial bores 98 communicates with fluid passage in a transfer seal 30' substantially the same as the transfer seal 30 shown in FIG. 1 and therefore it need not be described in detail here for the sake of brevity. Axially adjacent to the transfer seal 30' is a flanged sleeve 104 coaxially mounted to the shaft 96 by appropriate locking means such as the set screw 106. A bellows chamber 108 is sealingly secured at one end to the flange of the sleeve 104 and at its other end is sealingly secured to the head portion 110 of the core drill 112. The annular cutting blade portion 114 of the core drill 112 is placed against one side of the pane of glass 83 to thereby enclose a chamber 116. The chamber 116 is in fluid communication with the bellows chamber 108 via an axial bore 118 in the head portion 110 of the core drill 112.

As is illustrated in FIG. 2, the tubular shaft 96 extends through a hole in the glass pane 83 as the cutting blade portion 114 of the core drill 112 abuts against one side of the pane 83. A core drill 120 substantially the same core drill 110 is axially slidably secured to the tubular shaft 96 so as to rotate therewith and with its cutting blade portion abutting against the opposite side of the pane 83. A bellows chamber 122 and a flanged sleeve 124 substantially the same as the bellows chamber 108 and the flanged sleeve 104, respectively, and secured together in substantially the same way, are secured to the tubular shaft 96 so that the interior chamber of the bellows 122 fluidly communicates with the inner chamber of the tubular shaft 96 via the radial ports 102. The bellows chamber 122 further fluidly communicates with the annular cutting face of the core drill 120 via the axial passage 126 in the core drill head.

In operation the shaft 96 with the components 38', 104, 108 and 110 mounted thereon is secured within the drill chuck of the drill 18 and the drill housing is then secured within the clamping ring. The entire apparatus is then aligned by inserting the lower end of the shaft 96 into the hole around which stress points are to be relieved so that the vacuum feet 94 come into contact with the pane of glass. The vacuum feet 94 are then operatively engaged to secure the device to the pane of glass 83. The components 120, 122, and 124 are then mounted on the protruding portion of the shaft 96. The fluid pressure source (not shown) is then fluidly connected to the passage 38' of the transfer seal 30'. Thus, the core drills 112 and 130 are urged toward each other by the net force provided by the difference between the pressure in the bellows 108, 122 and the chambers 116, 128, respectively. As the shaft 96 is rotated at the same time, the pressure of the fluid in the chambers 116 and 128 is sufficient to provide a stream of fluid to flow past the cutting faces of the core drills 112 and 120 to remove the swarf which accumulates therearound.

Preferably, one of the bellows 108 or 122 is provided with a valve 127 to permit the pressure within the bellows chamber to be selectively released. When the cutting faces of the core drills meet at the center of the pane 83, the valve is opened so that the pressure in one of the bellows is less than the pressure in the other bellows. Thus, the force exerted against one core drill exceeds the force exerted against the other core drill and thus provides a relative displacement of the core drills with respect to the shaft 96 and the pane 83. The valve can be repeatedly opened and closed so that the core drills are repeatedly slid up and down the length of the shaft 96 to ream out the hole and remove any ridges that may be caused by worn cutting blades.

The device 80 is especially advantageous since the use of opposed core drills enables the hole to be drilled with no net lateral force exerted upon the fractured pane. In addition, although the devices 10 and 80 use fluid pressure drive means for urging the core drills against the glass pane, it is to be understood that the present method is not limited to practice with these particular devices. Core drill assemblies using spring pressure drive means such as those disclosed in application Ser. No. 819,904 can also be used to practice the method of the present invention.

After the damaged area having stress points has been removed by core drilling, the sharp edges around the periphery of the hole remain highly susceptible to breakage. Therefore, before the hole is refilled, the present method includes the step of beveling or grinding the sharp edge around the hole on each side of the pane. Thus, the sharp edge, which constitutes a point of high stress, is removed to further strengthen the required pane. Although a grinding wheel or the like can be used to remove the sharp edge, the beveling device 220, to be described in detail hereinafter, is especially practical for such grinding since it can be inserted in the chuck of the drill supported by the frame 82 which has been previously aligned over the hole.

Figure 4:
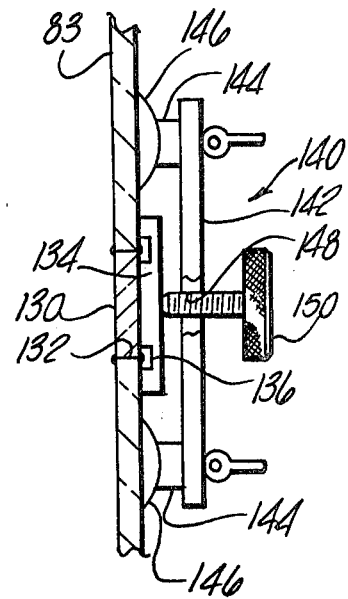
FIG. 4 is a cross-sectional view of a pane of solid glass showing the installation of a repair plug therein.

Once the hole has been drilled and the sharp edge around the hole removed, the hole can be plugged as shown in FIG. 4. A glass plug 130 having substantially the same width as the pane of glass 83 and having a diameter slightly smaller than the diameter of the core drilled hole 132 can be installed. The glass plug 130 is inserted into the hole 132 in the glass plane 83 by an applicator disc 134.

The applicator disc 134 comprises a circular disc made of plastic, metal or other appropriate resilient material having a diameter substantially larger than the diameter of a glass plug 130. The disc 134 is provided with an annular groove 136 on one side having an outer diameter greater than the diameter of the glass plug 130 and having an inner diameter less than the diameter of the glass plug 130. A pressure sensitive adhesive film is applied to the flat circular portion of the disc 134 radially inwardly from the annular groove 136 so that the glass plug 130 can be concentrically detachably secured to the applicator disc 134. A layer of uncured clear epoxy is then applied to the outer periphery of the glass plug 130 and the hole 132. The plug is then inserted into the hole 132 in the pane 83 so that the side of the applicator disc 134 extending radially outwardly from the annular groove 136 abuts against one side of the pane 83 and thereby aligns the plug 130 within the hole 132. The plug is then secured into position by a clamping device 140 as shown in FIG. 4 until the epoxy has cured and has fixedly secured the glass plug 130 within the pane 83.

The locking device 140 comprises a flat plate 142 which is supported away from one side of the glass pane 83 by at least two legs 144. Each leg 144 is provided with a vacuum foot 146 to detachably secure the locking device 140 to one side of the pane of glass. The plate 142 is provided with a threaded throughbore 148 near its center adapted to threadably engage a screw 150 therein. The bore 150 is substantially concentrically aligned with the applicator disc 134 and the vacuum feet 146 are then secured to the side of the glass pane 83. The screw 150 is then threaded into the hole to abut against the applicator disc 134 and urge it against the side of the pane 83. Thus, the disc and the attached glass plug 130 are immovably secured to the glass pane 83. When the epoxy has cured, the screw 150 is removed from the bore 148 and the vacuum feet 146 are released from the side of the glass pane 83. The applicator disc 134 can then be pulled away from the glass pane since only the adhesive film applied to the circular center portion maintains the applicator disc in its position on the pane. The annular groove 136 prevents excess epoxy which is urged from the hole 132 from coming in contact with the applicator disc 134 and bonding the disc to the side of the glass pane 83. The ridges of excess epoxy which have hardened to the sides of the glass pane 83 can be removed with a razor blade or other sharp knife so that the repaired area is substantially indetectable from the remainder of the glass pane.

The above-described method of repair utilizing core drills is extremely effective for repair of conical breaks in a pane of glass. Nevertheless, the damaged pane may have cracks therein which also must be repaired to adequately strengthen the pane. Therefore, the present method of glass repair includes a process for forming epoxy rivets spaced along the crack to strengthen the pane and prevent the danger of the cracked portions separating from the pane of glass. In addition, an epoxy rivet may be sufficient to repair a relatively small hole in a pane of glass. Moreover, an epoxy rivet can be installed at the end of a crack within the pane to effectively prevent the crack from lengthening.

Figure 5:
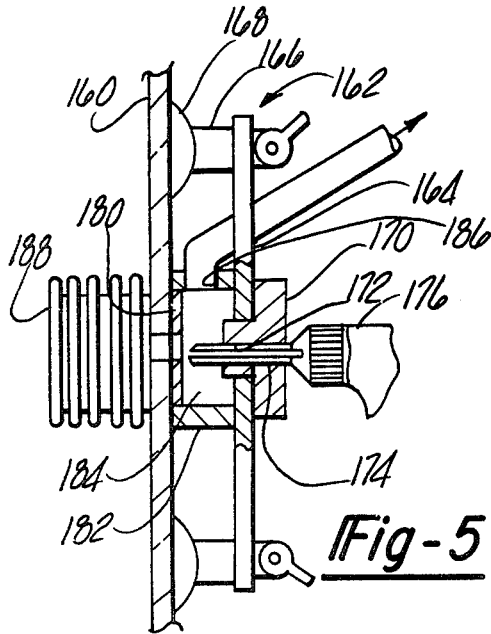
FIG. 5 is a cross-sectional fragmentary view of an apparatus for performing the sandblasting step of a method of the present invention.

An apparatus for cutting holes in which epoxy rivets are to be secured is shown in FIG. 5. The apparatus 162 is thereshown secured to the glass pane 160 and is adapted to support the nozzle of a sandblast gun adjacent to the area of the pane into which a hole is to be cut. The use of the sandblast gun is especially advantageous for repairing cracked panes since the use of a rotating core drill to cut the holes in the pane would cause excess stress in the pane and permit the crack to progress further.

The frame 162 comprises a plate 164 supported a slight distance away from the pane 160 by at least two legs 166. A selectively operable vacuum foot 168 is secured to the bottom of each leg 166 so that the frame can be detachably secured to one side of the glass pane 160. The plate 164 has a throughbore near its center adapted to rotatably support a bushing 170. The bushing 170 is provided with an eccentrically aligned throughbore 172 adapted to slidably and rotatably support a tubular nozzle 174 of a sandblast gun assembly 176. Thus, by manually rotating the bushing 170 in the throughbore in plate 164, the radial position of the sand stream from the nozzle 174 is circumferentially adjustable.

In order to accurately cut a smooth hole in the glass pane 160 and to prevent the flow of sand from impinging upon the surrounding area, and thereby marring the glass pane, a mask 180 in the shape of an annular disc is secured to the glass pane to limit the area of impact of the sand flow through the nozzle 174 to the area within the hole of the annular disc 180. A pliable annular housing 182 is disposed around the mask 180 and is wedged between the glass pane 160 and the plate 164 to thereby define a chamber 184 therebetween. The housing 182 is provided with a radial throughbore 186 which fluidly communicates at one end with a chamber 184 and at its other end with a selectively operable vacuum source (not shown). Thus, accumulated sand particles can be exhausted from within the chamber 184.

In addition, a capture chamber such as a bellows chamber 188 having one closed end is sealingly secured at its open end to the glass pane 160 around the area in which the hole is to be drilled. Thus, once the stream of sand from the nozzle 174 has broken through the pane, sand is prevented from being scattered throughout the area around the pane of glass. Moreover, the bellows chamber 188 is thus fluidly connected to the chamber 184 and therefore, enables the sand accumulated in the bellows 88 to be exhausted through the bore 186 by the vacuum source.

Once the glass has been completely removed from the unmasked area, which is accomplished by rotating the bushing 170 so that the spray from the nozzle 174 can be directed against the entire periphery of the unmasked area to thereby grind away all the glass therein, the hole can be filled with epoxy or the like in a manner to be hereinafter described. However, it is especially advantageous to first countersink each side of the hole so that the epoxy rivet secured therein has a widened diameter at each face of the pane. Thus, once the epoxy has hardened, the widened diameter portions of the rivets prevent lateral displacement of the portions of the pane adjacent to the crack with respect to each other. Moreover, such a rivet is effectively prevented from becoming dislodged from the pane despite shrinkage due to temperature changes or the like. Furthermore, countersinking the hole eliminates the sharp corner at the end of the hole on each side of the pane which is a point of high stress and highly susceptible to fracturing.

Figure 6:
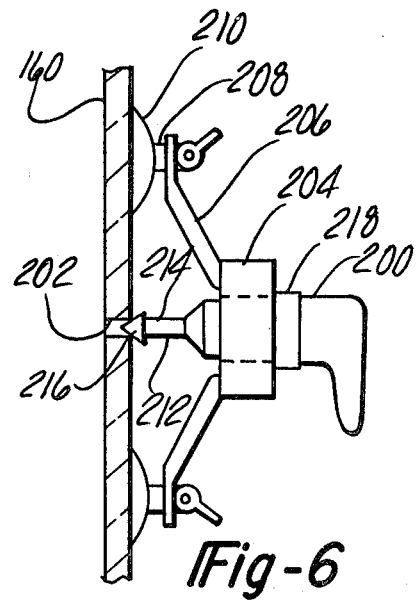
FIG. 6 is a cross-sectional view of a countersinking device for use in the present invention.

Referring now to FIG. 6 a countersinking device is thereshown comprising a portable variable speed drill motor and a mounting frame for axially slidably supporting the portable drill in alignment with the hole 202 in the pane of glass 160. The mounting frame comprises an annular ring 204 having at least three radially extending arms 206 secured thereto. The free end of each arm 206 is secured to a leg 208 having a selectively operable vacuum foot 210 secured thereto. The mounting frame is positioned so that the annular housing 204 is coaxially aligned with the hole 202 in the pane 160. The vacuum feet 210 are then secured to one side of the pane of glass. A drill bit 212 is inserted into the chuck of the drill 200 and the drill housing is then slid into the bore of the annular housing 204 until the bit 212 engages the hole 202.

The bit 212 comprises a stem portion 214 and a conical shaped head portion 216. The head portion 216 is provided with an abrasive coating such as a diamond or boron grit coating. Preferably, the housing of the drill 200 is provided with a depth stop 218 which abuts against the annular ring 204 to limit the depth to which the countersunk hole is drilled by the conical bit 216. Thus, when one side of the hole 202 has been countersunk and the apparatus is removed from that side of the pane and similarly aligned and secured to the opposite side of the pane 160, a symmetrical counterbored hole can be formed therein.

Referring now to FIGS. 7 and 8 an alternative means for providing the countersunk bores in the hole 202 is thereshown. The device 220 can be substituted for the drill bit 212 and thereby eliminates the need for aligning and mounting the frame and drill apparatus on each side of the pane 160 by providing a pair of cutting surfaces which simultaneously countersink the bore 202 on each side of the pane 160.

The beveling tool 220 comprises an elongated shaft 222 and the pair of axially spaced apart arms pivotally secured at one end to the shaft 222. The arms 224 and 226 are secured together by a spring means 228 which urges the arms together as they extend radially outwardly from the shaft 222. The adjacent sides of the arms 224 and 226 are beveled at the unsecured end of the arms so that as shown in FIG. 7 the planes of each beveled surface intersect at an acute angle. Each beveled surface has an abrasive coating secured thereto such as a diamond or boron grit coating.

The pivotal connection of the arms 224 and 226 to the shaft 222 is best shown in FIG. 8. Since the connection of both arms is substantially the same, only the connection of the arm 226 to the shaft 222 need be discussed in detail here. The shaft 222 is provided with a radial throughbore 230. The arm 226 has a pair of parallel legs 232 and 234 spaced apart a distance substantially equal to the diameter of the shaft 222. A pair of registering bores 236, 238 in the legs 232, 234, respectively, register with the radial throughbore in the shaft 222. The pin 240 is then entrained through the registering apertures 236, 230, and 238.

As shown in FIG. 7, the arms 224 and 226 extend radially outwardly farther than the edge of the hole 202. Thus, the edge of the hole 202 abuts the arms 224 and 226 intermediate the ends of the beveled surface of each arm. Therefore, after the mounting frame has been aligned with respect to the hole 202 and the shaft 222 has been inserted into the chuck of the drill and rotated thereby, the spring means 228 urges the arms towards each other so that the coated beveled surfaces grind the edge of the hole on each side of the pane 160. Thus, the hole is countersunk on each side with only a single alignment and mounting of the mounting frame on one side of the pane of glass.

After the hole 202 has been countersunk, the hole is filled with clear epoxy which is allowed to harden to form a rivet secured therein. FIGS. 9 and 10 illustrate a preferred method of forming the epoxy rivet.

A pair of substantially flat discs 250 are secured to opposite sides of the pane 160 and are concentrically aligned with the hole 202. Each disc 250 comprises a substantially flat circular disc having a radial groove 252 extending from the periphery of the disc to a point radially inwardly of the outer periphery of the countersunk portion of the hole 202. In addition, at least one disc 252 is provided with the throughbore 254 adapted to receive the needle 258 of the epoxy applicator syringe 256 so that the needle 258 can fluidly communicate with the hole 202.

The epoxy applicator 256 comprises a cylindrical housing 260 having a plunger 262 slidably secured therein. The stem of the plunger 262 extends outwardly from one end of the cylindrical housing 260. The other end of the housing 260 is secured to a needle 258 having the tubular passage therein communicating with the central chamber of the housing 260. The plunger 262 is slidably removable from the housing 260 so that the housing can be filled with a clear uncured epoxy and as the plunger is inserted and slid into the housing 260, the epoxy is urged through the needle 258 to be expelled from the end of the needle. Preferably, the interior of the cylindrical housing and the plunger 262 are coated with an appropriate material, such as teflon, to prevent clogging so that the device can be filled and used repeatedly.

A pressure sensitive adhesive is applied to the grooved side of each disc 250 so that the discs can be secured to opposite sides of the pane 160 to substantially enclose the hole 202. The needle 258 of the applicator 256 which has been filled with epoxy is then inserted into the bore 254 so that as the plunger is depressed into the housing 260 the clear epoxy is urged into and fills up the bore 202. As the bore 202 fills with epoxy, air entrapped within the bore is expelled through the radial grooves 252. Thus, a solid epoxy rivet is formed within the bore 202 and then allowed to harden therein before the discs 250 are removed from the sides of the pane of glass. Preferably, the bores 254 are inclined as shown in FIG. 11 so that when the needle 258 is removed from the bore before the epoxy has hardened, the epoxy is not urged to flow out of the bore 254 and thus leave the hole only partially filled. In addition, since bore 254 is relatively small since it need only be large enough to receive the needle 258 of the applicator 256, the viscosity of the clear epoxy in the hole 202 further prevents the epoxy from flowing out through the hole 254 before the epoxy has completely hardened.

In order to sufficiently strengthen a cracked pane, it is desirable to provide a plurality of the above-mentioned epoxy rivets along the length of the crack in the pane as well as at the ends of the crack. Such repair sufficiently removes the danger of collapse of the cracked pane if the rivets are spaced apart from each other approximately 16 inches along the length of the crack. Nevertheless, the pane can be additionally strengthened by injecting epoxy into the crack between adjacent epoxy rivets and allowing it to harden. However, since the space between the portions of the panes separated by the crack is extremely small, it has heretofore been difficult to apply sufficient pressure to effectively inject epoxy into the crack. The following device provides a simple yet effective means for injecting epoxy into a crack within a glass pane.

With reference now to FIG. 13, an injector gun 270 is thereshown comprising a handle portion, barrel portion, means for supplying clear uncured epoxy to the barrel portion and means for forcibly expelling the epoxy from the barrel portion. The end of the barrel is provided with a pliable seal ring so that as the end of the barrel is pressed against the pane along the length of the crack, the crack is in direct fluid communication with the fluid chamber in the barrel so that substantially all the force exerted on the epoxy in the chamber is used to inject epoxy into the crack. Thus, the device effectively injects the epoxy into the crack as well as being portable and easily maneuverable by hand.

The handle portion comprises an elongated cylindrical handle 272 and a plunger support housing 274 having a throughbore 276 aligned substantially normal to the handle 272 and adapted to slidably receive a plunger 282 therethrough. The barrel 278 comprises an elongated tube secured to the support housing 274 so that its central chamber 280 is coaxially aligned with the throughbore 276 of the support housing. A plunger 282 extends through the bore 276 into the chamber 280. A trigger lever 284 is pivotally secured to the plunger 282 at one end thereof and is pivotally secured to the support housing 274 by a pivot pin 286 mounted intermediate the plunger 282 and the handle portion 272 so that the unsecured end of the handle 284 extends substantially parallel to the handle portion 272. Thus, as the free end of the trigger 284 is pulled toward the handle 272 and thus pivots around the pin 286, the plunger 282 is slid forward in the chamber 280 toward the end of the barrel 278. A spring 288 is coaxially disposed around a portion of the plunger 282 protruding exteriorly of the housing 274, and thereby urges a flange 290 secured to the end of the plunger 282 away from the housing 274. Thus, the plunger 282 is normally retracted to its innermost position within the chamber 280 and the unsecured end of the trigger 284 is normally spaced its furthermost distance away from the handle 272.

The means for supplying clear uncured epoxy to the barrel 278 comprises an elongated housing 290 radially secured to the barrel 278 and having an axial throughbore 292 therein. The throughbore 292 includes an enlarged diameter portion 294 which extends upwardly to the end of the housing 290. The bore 292 fluidly communicates with a radial bore 296 in the barrel 278 which in turn fluidly communicates with the chamber 280 in the barrel 278. The top end of the housing 290 is closed by a threaded cap 298 which can be threadably engaged in a threaded portion at the top of the bore 294. A piston 300 having a diameter substantially the same as the diameter of the bore 294 is secured to the cap 298 by a spring 302 which urges the piston 302 away from the cap 298 and into the bore 294. Preferably, the housing 290 and the barrel 278 are made in one piece.

Before the cap 298 is installed in the housing 290, the bore 294 is filled with clear uncured epoxy. When the cap is installed, the piston 300 forces the epoxy through the bores 294 and 292 and into the radial bore 296. When the piston is in its retracted position, the bore 296 is in fluid communication with the chamber 280 and thus the piston forces the epoxy into the chamber 280. When the trigger 284 is pressed towards the handle 272 which correspondingly urges the plunger 288 toward the end of the barrel, the plunger 282 then seals the bore 296 from further fluid communication with the chamber 280. Moreover, the epoxy within the chamber 280 is forced outwardly through the end of the chamber 280 by the end of the plunger 282.

An annular seal ring 308 is coaxially secured about the chamber 280 within an annular groove 306 in the end of the barrel 278. The annular ring 308 is made of a pliable material and extends outwardly from the end of the barrel 278 so that as the end of the barrel is urged against the pane of glass, the annular ring is slightly deformed to form a tight seal around the area of the crack to be filled. Thus substantially all the pressure exerted on the epoxy within the chamber 280 is utilized to inject the epoxy into the crack in the pane since extraneous fluid communication is prevented by the seal 308. Preferably, the seal 308 is sufficiently resilient to permit the end of the barrel 278 to be slid along the length of the crack as the epoxy is being applied while the deformation of the seal maintains a sealed connection between the chamber 280 and the crack.

Thus, the cracked pane can be resecured along substantially the entire length of the crack to prevent relative displacement of the portions of glass adjacent to the crack. Moreover, the cost of such repair to eliminate the dangers presented by fractured panes is substantially less costly than replacement of the entire pane. In addition, it should be noted that the device 270 can be substituted for the applicator 256 shown in FIG. 11 and used for the formation of epoxy rivets.

A special application of the present glass repair system concerns the repair of laminated glass panes such as motor vehicle windshields. A commonly-known construction of such windshields consists of a pair of glass panes securely fastened to opposite sides of a sheet of plastic.

As is commonly known when a sharp object impacts against a pane of glass a conical-shaped fracture occurs in the pane of glass. In a single pane of glass the conical-shaped fragment is dislodged from the pane so that the remaining hole can be repaired by one of the methods disclosed previously. However, in the case of a laminated windshield as described above, the conical-shaped fragment remains entrapped between the outer surface of the glass pane and the plastic sheet secured to the inner side of the glass pane. Heretofore, it has been extremely difficult if not altogether impossible to effectively or economically repair the fractured pane.

The present invention provides a method for removing the stress points caused by the impact and for refilling the portion of the windshield that has been removed.

The stress cracks and sharp edges of the damaged pane are removed by core drilling around the damaged area of the pane. A core drilling device as shown in FIG. 1 can be used in the manner previously described. However, since only one pane of the laminated windshield is damaged, the displacement of the core drill with respect to the core drill shaft is limited to limit the depth of the cut.

Although ideally the depth of the cut would be the same as the width of the damaged pane, the method of the present invention provides a core drill cutting depth slightly greater than the width of the damaged pane for reasons to become hereinafter apparent.

When a core drill is axially urged against one side of a glass pane and rotated so as to cut a hole therethrough, lateral stress is exerted against the pane. The pane is able to withstand this stress throughout most of the drilling operation. However, as the core drill reaches the opposite end of the pane, the lateral force is exerted upon a narrow area still to be cut. This narrow area of brittle glass becomes weakened and unable to withstand the lateral force exerted by the core drill and thus, tends to break off prior to its being ground away by the rotating core drill. Such a break extends along an oblique line extending radially outwardly from the perimeter of the drilled hole. For repair of solid glass panes, this premature breakage can be eliminated by the use of the constant force double core drill shown in FIG. 2. However, to repair a single layer of a laminated windshield, another method must be employed.

The plastic layer adjacent the damaged pane is relatively malleable, especially when heated by the frictional core drilling operation. Thus, it is unable to provide sufficient support to prevent the premature breakage of the adjacent glass pane. However, if the plastic is cooled to extremely low temperatures, it becomes rigid and has characteristics similar to those of glass. Thus, the frozen plastic provides greater support for the adjacent glass pane. Therefore, for the repair of a damaged pane in the laminated windshield, the method of the present invention includes the step of cooling the area of the plastic sheet behind the damaged area of the glass pane. As shown in FIG. 1, a vortex air cooling nozzle 350 is clamped to the side of the windshield opposite the damaged pane.

In addition, since such cooling of the plastic behind the damaged area provides the plastic with characteristics substantially the same as the adjacent brittle glass pane, the plastic can be cut by the core drill without the deformation of the plastic layer or clogging of the core drill which would occur if the plastic were warm and soft. Consequently, the present method for repair of laminated panes enables a hole to be drilled through the glass pane without ridges or the like at the inner end of the damaged pane, since the core drill can be extended past the inner side of the damaged pane into the adjacent plastic layer.

The depth of cut is limited as follows. The core drill assembly 10 is mounted in the drill chuck of the portable light-weight drill 18 and the frame 82 aligned over the damaged area. The drill housing is then locked into the ring 84 of the frame so that the lower end of the head 54 of the core drill is separated from the locking ring 63 a distance approximately equal to the width of the damaged glass pane plus 0.120 inch. Thus, when the fluid pressure drive means has been activated and the cutting operation commenced, cutting continues until the lower end of head 54 comes into abutment with the ring and prevents further cutting into the windshield.

The core drilling assembly is then removed along with the damaged portion of glass. The plastic is then warmed so that the cut initiated by the core drill can be completed with a sharp blade. The circular plastic portion is then removed.

The hole is then refilled by inserting a plastic disc and a glass plug having a combined width substantially the same as the depth of the hole and having diameters slightly less than the diameter of the hole in the windshield. Preferably, the width of the plastic disc is slightly greater than the width of the plastic removed to permit the deformable plastic to compensate for variations in the width of the glass plugs so that the glass plug can be positioned flush with the side of the surrounding glass pane as hereinafter described. Both sides of the plastic disc and the unexposed side of the glass plug are coated with clear uncured epoxy to securely fasten them within the windshield. In addition, the peripheral edges of the disc and plug are also coated with epoxy.

After the coated disc and plug have been inserted into the hole, a clamping device, such as the device 140 in FIG. 4 is secured to the windshield to urge the pieces into the windshield so that the exposed surface of the glass plug is flush with the surface of the surrounding glass pane. The epoxy is then allowed to cure before the clamping device is removed. After the epoxy was cured, excess epoxy forced form the hole can be scraped from the side of the pane with a sharp blade.

Although the method has been described for repairing a laminated windshield, it is to be understood that the method of the present invention is not so limited but is utilized for repair of any similarly constructed laminated pane.

It can thus be seen that the system of the present invention includes methods that provide many advantages over previously-known methods for repairing glass panes. The core drills used to practice the method can be made at less expense without reducing the length of service of each core drill. In addition, the fluid pressure means of the core drill assembly permits a selectively adjustable constant cutting force to be applied to the pane of glass and thus eliminates excess stresses on the pane of glass while the pane is being cut. Moreover, since the axial force applied to each core drill of the double core drill assembly can be separately adjustable, the changing net force against the pair of core drills can be utilized to ream out the core drilled hole to provide a chipless hole.

The system also provides an easily performed method for repairing fractures in a pane of glass by installing epoxy rivets which are stronger and more effective than previously-known repairs of cracked panes. In addition, the system provides a more efficient method than previously-known apparatus to repair conical fractures in a pane of a laminated windshield.

Although the term "uncured clear epoxy" has been used throughout the disclosure, it is to be understood that the method of the present invention can be practiced by using other glues which, when cured, have a refraction index substantially the same as the refraction index of the surrounding glass. Thus, the term "uncured clear epoxy" is intended to include these other adhesives as well throughout the application.

Having thus described my invention many modifications thereto will become apparent to those skilled in the pertinent art without departing from the scope and spirit of the invention as defined in the appended claims.

What is claimed is:

1. A method for repairing impact holes in a pane of glass comprising, sandblasting the sharp edges around the impact hole to remove the edges containing stress cracks an amount sufficient to provide a hole in the pane through which a core drill support rod can be inserted, core drilling around the entire damaged area at a constant force to remove it from the pane while flushing swarf radially outwardly past the face of the core drill by fluid pressure means, beveling the sharp edges at each side of the pane around the hole formed by removing the damaged area, cleaning and drying the periphery of the newly drilled hole and the adjacent area of the pane, concentrically securing a plug having a diameter slightly smaller than the diameter of the newly drilled hole and having a width substantially the same as the width of the pane to an applicator disc having a diameter substantially larger than the diameter of the hole with pressure sensitive adhesive, applying clear epoxy to the peripheral surfaces of the glass plug and newly drilled hole, inserting the glass plug into the newly drilled hole until the applicator disc abuts against the side of the pane, detachably securing said applicator disc to the pane, removing the applicator disc after the epoxy has cured, and scraping excess adhesive from the side of the pane by using a sharp blade.

2. The invention as defined in claim 1 wherein said core drilling step comprises, aligning a drill support frame adapted to support a drill chuck concentrically over the impact hole by inserting a conical-headed quill in the drill chuck, centering the head of the quill within the impact hole, and detachably securing the frame to one side of the glass pane;

replacing the quill with a core drill assembly having a core drill support rod with fluid passage means therein, at least one core drill coaxially and axially slidably mounted on said support rod, and means for urging said at least one core drill against one side of the pane; and rotating said shaft and core drill by means for the portable lightweight drill motor.

3. The invention as defined in claim 2 wherein said at least one core drill comprises two core drills coaxially aligned to abut against opposite sides of the pane and said drilling step further comprises the step of reaming the hole drilled after the two core drills meet at the center of the pane by axially shifting the pair of core drills back and forth.

4. A method for repairing cracks in a glass pane comprising, masking a circular area of glass to be removed along the length of the crack by securing an annular mask to the pane with a pressure sensitive adhesive, to expose the circular area to be removed, positioning a frame having a rotatable bushing adapted to eccentrically support a sandblasting gun nozzle so that said nozzle is aligned to direct a selectively positionable stream of sand against the entire exposed circular area, detachably securing said frame to the masked side of the pane, inserting the nozzle of the sandblasting gun in the bushing of the frame, sandblasting the entire exposed circular area by rotating the bushing in the frame so that the glass within the entire exposed area can be removed to thus provide a circular hole, detaching the frame and sandblast gun, countersinking the hole at each end, concentrically securing a pair of annularly grooved discs having a diameter substantially larger than the diameter of the hole, to opposite sides of the pane to thereby substantially enclose the hole, inserting clear epoxy into the substantially enclosed hole through an angled axial throughbore in one of said discs, until the hole is completely filled, and removing said discs after the epoxy has cured.

5. The invention as defined in claim 4 and further comprising, inserting clear epoxy into the crack along its length under pressure sufficient to substantially fill the crack, and scraping excess plastic from the sides of the pane with a sharp blade.

6. The invention as defined in claim 4 wherein said masking step further comprises aligning the exposed circular area to be removed around the end of a crack within the pane.

7. A method for repairing fractures in a laminated windshield having a sheet of plastic disposed between two panes of glass, the fracture being caused by impact of a relatively sharp object against the windshield and causing a conical portion of glass to be separated from one of the panes, said method comprising, cooling a portion of the plastic sheet adjacent the damaged area, core drilling the damaged pane around the damaged area to a depth slightly greater than the width of the damaged pane so that the plastic sheet is partly cut, removing the damaged area of the glass pane, warming the cooled portion of the plastic sheet, cutting the plastic sheet through the cut started by the core drill, removing the circular plastic piece, coating the periphery and both sides of a plastic disc and the periphery and one side of a glass plug with clear epoxy, said disc and said plug having diameters slightly smaller than the diameter of the core drilled hole, and having a combined width substantially the same as the depth of the hole in the windshield, inserting the plastic disc into the hole, inserting the glass plug into the hole over the plastic disc so that the coated side of the plug abuts against the plastic disc, and pressing the glass plug into the hole so that the uncoated side is flush with the side of the surrounding glass pane until the epoxy cures.

8. The invention as defined in claim 7 wherein said core drilling step comprises, positioning a drill support frame adapted to support a drill chuck concentrically over the damaged area at a selectively adjustable height, detachably clamping the frame to the damaged side of the windshield, inserting a core drill assembly into the drill chuck, adjusting the height of the drill chuck so that the cutting depth of the core drill is limited to approximately 0.120 inch greater than the width of the damaged glass pane of the windshield, core drilling the damaged pane around the damaged area to a depth slightly greater than the width of the damaged area, and removing the core drill assembly after the drill speed increases as depth limit is reached.

9. The invention as defined in claim 7 and further comprising the steps of beveling the peripheral edge of the core drilled hole, and cleaning and drying the periphery of the hole and the surrounding glass area before the coating step, and further comprising the step of scraping the excess epoxy forced from the hole by the pressing step from the side of the glass pane after the epoxy has cured.

* * * * *

UNITED STATES PATENT AND TRADEMARK OFFICE
CERTIFICATE OF CORRECTION

PATENT NO. : 4,208,229
DATED : June 17, 1980
INVENTOR(S) : Dante S. Giardini

It is certified that error appears in the above-identified patent and that said Letters Patent are hereby corrected as shown below:

In the Abstract, line 2, after "holes" insert --to be--;

Column 1, line 39, delete "stress." and insert --stress within a pane of glass.-- therefor;

Column 1, line 45, delete "forces" and insert --force-- therefor;

Column 2, after line 13, insert the following:
--Oftentimes it is disadvantageous to use a core drill to relieve the stress area in the pane of glass since they remove a relatively large area of glass around the fracture. Thus, when only a small hole is to be repaired in the glass, it would be advantageous to remove only a small portion of the glass around the small hole in order to relieve the stress. In addition, the use of a core drill to relieve the high stress at the end of a crack in a glass pane is disadvantageous because the rotational force of the core drills increases the stress exerted upon the pane and can cause the crack to lengthen. Thus, it would be advantageous to remove such stress points from the pane without exerting torsional stresses incident to the core drilling.--;

Column 2, delete lines 25 through 38;

Column 3, line 59, delete "th" and insert --the-- therefor;

Column 3, line 63, delete "secured" and insert --secures-- therefor;

Column 4, line 20, delete "simi-";

UNITED STATES PATENT AND TRADEMARK OFFICE
CERTIFICATE OF CORRECTION

PATENT NO. : 4,208,229
DATED : June 17, 1980
INVENTOR(S) : Dante S. Giardini

It is certified that error appears in the above-identified patent and that said Letters Patent are hereby corrected as shown below:

Column 4, line 21, delete "larly-shaped";

Column 4, line 28, after "The" insert --variety of steps in the--;

Column 4, line 58, delete "th" and insert --the-- therefor;

Column 5, line 35, delete "ally" and insert --ally,-- therefor;

Column 5, line 66, after "drill" insert --shank--;

Column 6, line 1, delete "and" and insert --in-- therefor;

Column 6, line 25, delete "on" and insert --upon-- therefor;

Column 12, line 18, delete "11" and insert --9--;

Column 12, line 43, delete "13" and insert --11--;

Column 13, line 27, second occurrence delete "302" and insert --300-- therefor;

Column 14, line 7, delete "known" and insert --known,-- therefor;

Column 15, line 24, delete "further" and insert --deeper-- therefor;

Column 15, line 23, after "ring" insert --63--.

Column 15, line 51, delete "was" and insert --has-- therefor;

UNITED STATES PATENT AND TRADEMARK OFFICE
CERTIFICATE OF CORRECTION

PATENT NO. : 4,208,229

DATED : June 17, 1980

INVENTOR(S) : Dante S. Giardini

It is certified that error appears in the above-identified patent and that said Letters Patent are hereby corrected as shown below:

Column 16, line 8, after "than" insert --was possible with--;

Columne 17, line 5, delete "for" and insert --of-- therefor.

Signed and Sealed this

Thirteenth Day of January 1981

[SEAL]

*Attest:*

SIDNEY A. DIAMOND

*Attesting Officer*     *Commissioner of Patents and Trademarks*